United States Patent [19]
Predöhl

[11] Patent Number: 5,183,606
[45] Date of Patent: * Feb. 2, 1993

[54] METHOD OF MAKING A PLASTIC FOIL AND FOR WINDING THE PLASTIC FOIL INTO A COIL OR ROLL

[75] Inventor: Willi Predöhl, Hennef 1- Brol, Fed. Rep. of Germany

[73] Assignee: Reifenhauser GmbH & Co. Maschinenfabrik, Troisdorf, Fed. Rep. of Germany

[*] Notice: The portion of the term of this patent subsequent to Nov. 10, 2009 has been disclaimed.

[21] Appl. No.: 688,927

[22] Filed: Apr. 19, 1991

[30] Foreign Application Priority Data

Apr. 27, 1990 [DE] Fed. Rep. of Germany ....... 4013611

[51] Int. Cl.$^5$ .................... B29C 47/92; B29C 55/28
[52] U.S. Cl. ............... 264/40.1; 264/211.12; 264/564; 425/141
[58] Field of Search ........ 264/40.1, 211.12, 564; 425/135, 141

[56] References Cited

U.S. PATENT DOCUMENTS 4,758,390 7/1988 Henze ...................... 264/40.1

Primary Examiner—Leo B. Tentoni
Attorney, Agent, or Firm—Herbert Dubno; Andrew Wilford

[57] ABSTRACT

Blown or flat-extruded plastic film having systematic plus or minus errors in thickness along the width of the film have a thickness profile measured and the measured profile is fed to a computer which controls the extruded film or tube from which the film is blown so that the foil thickness will be increased between regions of plus-thickness error or decreased in sense between regions of minus-thickness errors, or both alternatingly, so that the resulting coil is cylindrical with significant precision and without the need to move the blowing head or tube flattening device.

8 Claims, 3 Drawing Sheets

METHOD OF MAKING A PLASTIC FOIL AND FOR WINDING THE PLASTIC FOIL INTO A COIL OR ROLL

CROSS REFERENCE TO RELATED APPLICATION

This application is related to the copending and commonly assigned application Ser No. 07/686,824, filed Apr. 17, 1991 and based upon German application P40 13 612.4 filed Apr. 17, 1990.

FIELD OF THE INVENTION

My present invention relates to a method of making a plastic foil and of coiling the plastic foil thus made into a coil or roll. More particularly, the invention relates to a method of making a coil of a plastic foil, especially a thermoplastic foil, which can be composed of a thermoplastic material which is thermoplastified in an extruder or the like.

The invention relates, moreover, to the formation of a coil or roll in which the cylindrical contour or cross section is maintained over the entire length of the coil, and the coil, upon completion, conforms as much as possible to the configuration of a right circular cylinder.

BACKGROUND OF THE INVENTION

It is known that in the production of plastic foils which can be wound to form a coil, thickness-error profiles can be detected for the foil across the width, of which systematic plus thickness errors and systematic minus thickness errors can be discerned. The term "systematic" is here used to refer to errors in the thickness of the foil that arise as a function of some property of the foil-fabricating system.

Such errors can develop in association with certain parts of the manufacturing system and, consequently, when a foil having such systematic thickness errors is wound in a coil, the plus thickness errors, i.e. thicknesses greater than a desired or set point value of the foil thickness, tend to accumulate in the coil to form annular bulges therein. Conversely, minus thickness errors or thickness deviations from the standard or set point value, which are such that the thickness in a particular region of the foil is less than the set point value, can accumulate to form annular troughs in the coil.

The system-determined thickness errors may result, for example, from tool or extrusion die tolerances.

Systematic thickness errors are largely unavoidable and appear in the cross section profile of the foil produced and in a stationary state of the apparatus for producing the plastic foil, always arise at the same location across the width of the foil. If efforts are not made to avoid the build up of bulges and troughs in the coil, the result is a barrel-shaped coil with annular bulges and troughs as described above.

It has been proposed, because of this problem, to avoid the addition of thickness errors as the foil is wound into a coil. This can be achieved by shifting the thickness-error profile over the width of the plastic foil or film so that there are no locations on the coil where there are special build ups of the errors. The coil thus appears to be free from visible addition of thickness errors. In this case, the thickness errors are shifted by and large from layer to layer to different locations along the length of the coil.

To achieve this in the production of so-called blown film, in which a thermoplastified tube is generated by extruding the thermo-plastified synthetic resin through an annular nozzle, the tube is then blown to form a balloon and the balloon is flattened to form a web which is wound into the coil, either the blowing head with the extrusion tool or die must be given an angular periodic oscillating movement or the so-called flattening device must be correspondingly periodically moved. In some cases, both the blowing head and die and the flattening unit are moved in an angularly oscillating sense.

An apparatus in which the flattening device and the blowing head or both are oscillated is of expensive construction, and is not always capable of satisfactory results since the coil has irregularities, although these are not always in the form of the annular bulges and troughs described. In wide-mouth dies from which a flat web of the foil or film is extruded directly, i.e. so-called slot-nozzle dies, the magnitude of the thickness errors can be reduced and the thickness-error profile leveled in response, for example, to a measured-thickness profile, by adjusting the gap width of the widemouth die. The superposition and distribution of singular thickness errors is also known in this context.

This technique does reduce the thickness tolerance although in practice it is found that there is a residual detrimental thickness profile with error addition in the coil.

The above-mentioned patent application describes a process for achieving a cylindrical contour at the end of coiling of the foil with significantly greater precision when an error distribution is no longer carried out.

This system allows the elimination of moving structures in units hitherto required for error distribution and thus represents a significant simplification. This method is characterized by a measurement of the thickness-error profile of the produced plastic foil with its systematic plus thickness errors and/or minus thickness errors before the foil is wound into the coil.

According to this method, a number of n layers of the foil with the systematic plus thickness errors and/or minus thickness errors are wound in a coil such that $n=1$ or n is $\geq 1$ and thereafter a number of layers with inverse thickness-error profile are wound on the coil. The process is repeated alternately between layers of the one thickness-error profile and layers of the inverse thickness-error profile until the end of the coil with a sufficiently exact cylindrical contour is reached.

This process results in a coil with a very precise cylindrical contour in which the individual layers are packed firmly together and which is practically free from interlayer spaces and which, moreover, is free from air inclusions. It is especially advantageous with thin plastic films.

OBJECTS OF THE INVENTION

It is, therefore, the principal object of this invention to provide an improved method of forming coils of plastic film or foil which have, to the greatest possible extent, a truly cylindrical contour while avoiding the drawbacks of earlier systems.

Another object of this invention is to provide a method of making a plastic foil and winding that foil into a coil or roll so that the coil will be free from bulges and troughs or, stated otherwise, will have a very precise cylindrical contour at the end of the winding operation.

Yet another object of the invention is to provide a method for the purposes described which will be free from the prior art drawbacks outlined above.

SUMMARY OF THE INVENTION

These objects are attained, in accordance with the invention by effecting a positive influence upon the thickness of the foil, i.e. increasing thickness during the fabrication of the foil and the rolling thereof into a coil, by a method of making a coil which comprises the steps of:

(a) continuously forming a flat web of a plastic foil having over a width thereof a thickness-error profile including system-produced plus thickness errors and minus thickness errors;

(b) winding the web into a coil;

(c) measuring the thickness-error profile and feeding a signal representing the thickness-error profile to a computer;

(d) automatically determining with the computer a thickness correction by which a zone between two successive regions with plus thickness errors must be increased to eliminate bulges in the coil at the regions with plus thickness errors and controlling the forming of the web to increase the thickness of the web at the zone by the thickness correction;

(e) maintaining the increase in the thickness of the web at the zone for a length of the web wound on the coil to maintain a substantially cylindrical contour thereof; and (f) iteratively repeating steps (c) to (e) until the coil is completely Wound With the Web, thereby forming a complete coil with a substantially constant cross section cylindrical contour.

It is also possible to practice the invention by exerting a negative influence upon the thickness of the foil, i.e. reducing the film thickness during its manufacture. This approach involves the steps of:

(a) continuously forming a flat web of a plastic foil having over a width thereof a thickness-error profile including system-produced plus thickness errors and minus thickness errors;

(b) winding the web into a coil;

(c) measuring the thickness-error profile and feeding a signal representing the thickness-error profile to a computer;

(d) automatically determining with the computer a thickness correction by which a zone between two successive regions with minus thickness errors must be decreased to eliminate troughs in the coil at the regions with minus thickness errors and controlling the forming of the web to decrease the thickness of the web at the zone by the thickness correction;

(e) maintaining the decrease in the thickness of the web at the zone for a length of the web wound on the coil to maintain a substantially cylindrical contour thereof; and (f) iteratively repeating steps (c) to (e) until the coil is completely wound with the web, thereby forming a complete coil with a substantially constant cross section cylindrical contour.

According to a further feature of the invention, the positive and negative effects of the thickness of the foil or film can be carried out alternatingly, i.e. by a method which comprises the steps of:

(a) continuously forming a flat web of a plastic foil having over a width thereof a thickness-error profile including system-produced plus thickness errors and minus thickness errors;

(b) winding the web into a coil;

(c) measuring the thickness-error profile and feeding a signal representing the thickness-error profile to a computer;

(d) automatically determining with the computer a thickness correction by which a zone between two successive regions with minus thickness errors must be decreased to eliminate troughs in the coil at the regions with minus thickness errors and controlling the forming of the web to decrease the thickness of the web at the zone by the thickness correction;

(e) alternatingly with step (d) automatically determining with the computer a thickness correction by which another zone between two successive regions with plus thickness errors must be increased to eliminate bulges in the coil at the regions with plus thickness errors and controlling the forming of the web to increase the thickness of the web at the other zone by the thickness correction., (f) maintaining the decrease and increase in the thickness of the web at the zones for a length of the web wound on the coil to maintain a substantially cylindrical contour thereof; and (g) iteratively repeating steps (c) to (f) until the coil is completely wound with the web, thereby forming a complete coil with a substantially constant cross section cylindrical contour.

According to the invention, the thickness-error profile can be measured directly upon the plastic foil and preferably directly before the foil is coiled upon the roll.

It is also possible, however, to determine the thickness-error profile of the foil indirectly by monitoring the deviation of the contour of the coils as it is continuously formed from the predetermined cylindrical contour and transforming the deviation into a thickness of the foil in the appropriate region of the coil. As a consequence, the computer can determine how the zone between the error regions with plus thickness errors or minus thickness errors must be increased or decreased It is possible in accordance with the invention, further, to combine the measurement of the thickness profile on the foil and the contour measurement of the coil whereby both values are fed to the computer and are weighed respectively for optimum response of the computer to control the production of the foil and the coiling thereof.

According to a further feature of the invention, the thickness-error profile of the foil has several plus thickness errors and also several minus thickness errors. The zones, therefore, are the zones between these thickness-error regions. The method of the invention, however, operates analogously when across the width of the plastic foil there is only a single systematic plus thickness error or only one systematic minus thickness error.

The thickness measurements can be taken in various ways, according to the invention. For direct thickness measurements of the plastic foil, a throughgoing radiation measurement system may be used. In this case, the foil is irradiated with a penetrating radiation and the thickness of the foil is determined by the amount of absorption.

With indirect measurement of the thickness profile based upon contour of the coil, the measurement can be carried out with the aid of laser beams, and a sensor responsive to the laser beam scanning of the coil contour. Laser scanning systems are known in the art.

It is possible to operate with mechanical sensing of the contour of the coil. In either case, the thickness profile of the plastic foil can be ascertained by means conventional in current measurement technology without difficulty.

The computer is programmed so that it will detect the positive or negative corrections which are required in the zones between the error regions and can, for example, make the corrections taking into consideration that the length of the individual layer in the winding of the coil, i.e. the lengths of the successive turns, increase from layer to layer.

For optimum results, the thickness-error profile should be measured with great precision and the gap width of the die or tool should be adjusted with equal precision Systems for adjusting the extrusion gap width are found, for example, in German patent documents DE 34 27 912 (U.S. Pat. No. 4,592,710), DE 34 27 915 (U.S. Pat. No. 4,594,063) and DE 35 30 383 (U.S. Pat. No. 4,721,447). With operations in accordance with the invention as described, it is no longer required to effect error distribution. As a consequence, one can operate with stationary dies from which the plastic foil are indirectly or directly formed.

In the case of a film-blowing apparatus, this means that the rotation of the blowing head is no longer required. In the embodiment in which a blown film forms the foil web, the foil tube is formed as a balloon or bubble and thereafter is flattened.

The foil is fed directly to the coil subsequent to flattening and, optionally, after a varied edge separation of the tube. In the embodiment for the production of so-called flat film with the aid of a wide-slit nozzle, the flat foil is fed to the coil directly without the need for any means for distributing the thickness errors.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
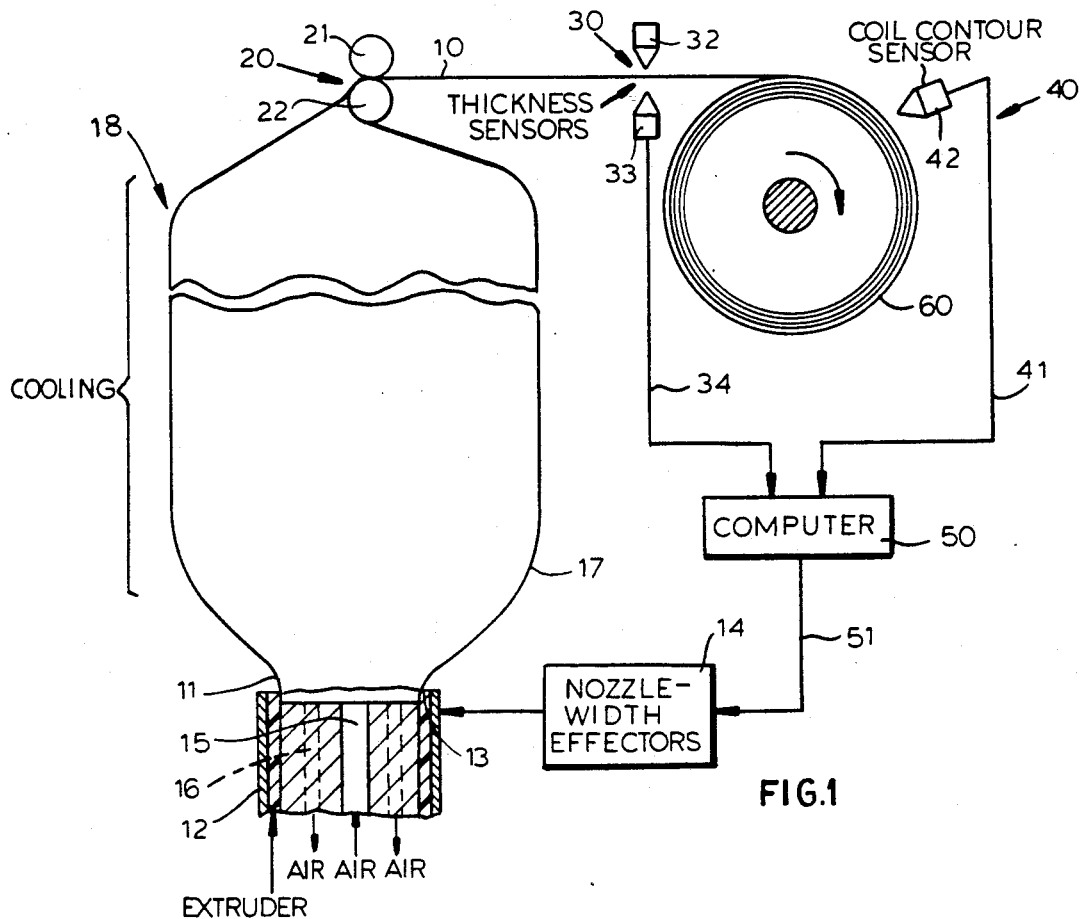
FIG. 1 is a diagram illustrating a film-blowing apparatus according to the invention.

As can be seen from FIG. 1, a web 10 of a flat synthetic resin foil or film can be formed by extruding a tube 11 through an extrusion die 12 whose outlet nozzle 13 may be provided with effectors 14, for example servomotors, all around the nozzle orifice, to control the extrusion gap width and, therefore, the thickness of the tube 11 at the various locations around the circumference thereof.

Cooling air is supplied at 15 to the blowing head and worm air can be removed by passages 16 as is known in the art.

The thermoplastic tube 11 can thereby be blown to form a balloon 17 of greatly reduced wall thickness, the balloon or bubble being externally cooled in the region 18. The stable film is then flattened, e.g. at a flattening device 20 which can comprise a pair of rollers 21 and 22 to form the web 10. Along an edge of the flattened web, the tube can be slit, if desired.

Figure 3:
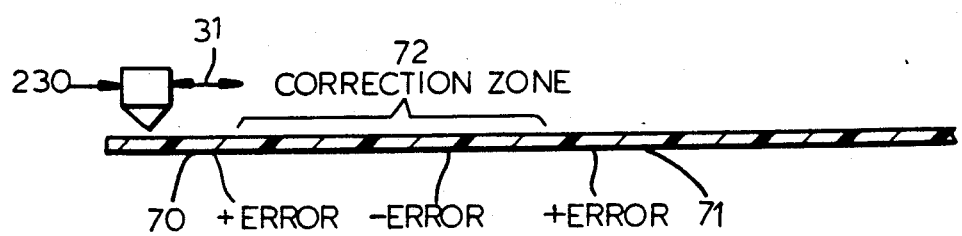
FIG. 3 is a diagram taken across a portion of the width of a film greatly enlarged in scale, illustrating principles of the invention.

According to the invention, a sensor unit 30 is provided which can monitor the thickness of the web 10 across the entire width thereof, e.g. by scanning back and forth across the web in a manner represented only diagrammatically in FIG. 3 by the arrow 31. In this embodiment, the thickness-measuring unit comprises a source 32 of penetrating radiation and a detector 33 responsive to that radiation and which delivers a signal as represented at 34 to a computer 50 that receives a signal 41 from a coil contour sensor 41 which can be a laser-based type.

The sensor 30 supplies a thickness signal to the computer 50 representing the thickness profile of the web and the sensor 42 of the coil contour sensor unit 40 supplies a signal which indirectly represents the foil thickness. The computer, in accordance with the principles described previously, feeds control signals 51 to the nozzle-width effectors 14.

As has been described, the computer discerns the plus thickness-error regions and the correction required between these regions to control effectors in the intervening zones, to increase the thickness of the tube 11 which is extruded and hence the thickness of the film at the corresponding regions of the coil 60 into which the web 60 is wound.

The computer also ascertains the correction required in the zone between regions of minus thickness error and decreases the thickness of the tube 11 in the corresponding regions, the corrections to reduce and increase the thickness of the web being effected alternatingly.

Figure 5:
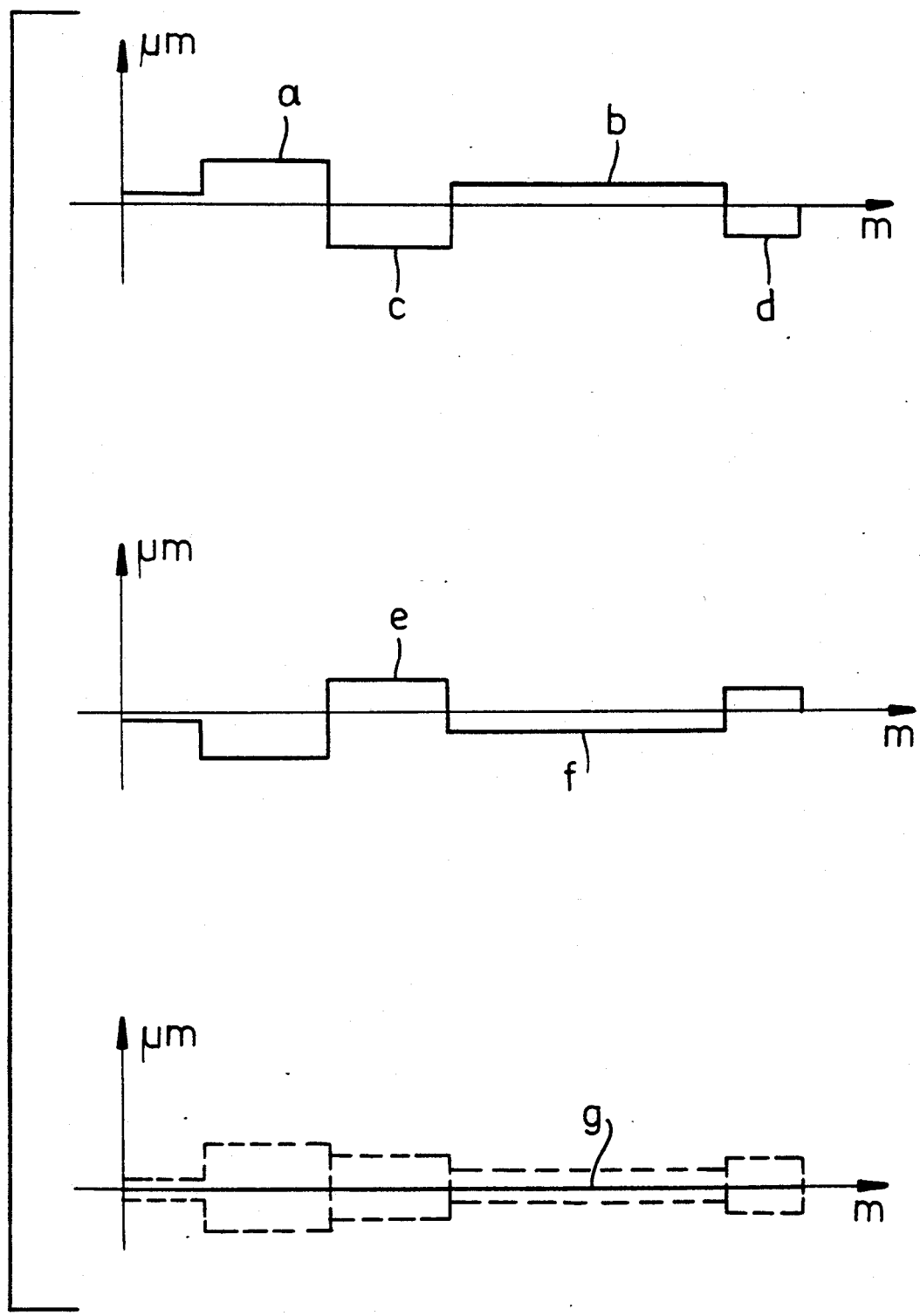
FIG. 5 is a set of graphs illustrating principles of the present invention.

Referring to FIG. 5, in which the upper graph represents a thickness-error profile ascertained by a sensor in accordance with the invention, the thickness is plotted in $\mu m$ along the ordinate against the width of the web plotted along the abscissa in meters, regions a and b of excess thickness, representing plus thickness error regions, alternate with regions c and d which represent minus thickness-error regions.

As noted, the computer can ascertain a correction e, second graph of FIG. 5 over a zone between the regions a and b at which the thickness of the tube 11 is to be increased, as well as a correction f over a zone between the regions c and d by which the thickness of the wall of the tube is to be decreased.

When these corrections are applied (lower graph of FIG. 5), the contour of the roll represented by the abscissa g in the lower graph of FIG. 5 will be substantially level.

Figure 2:
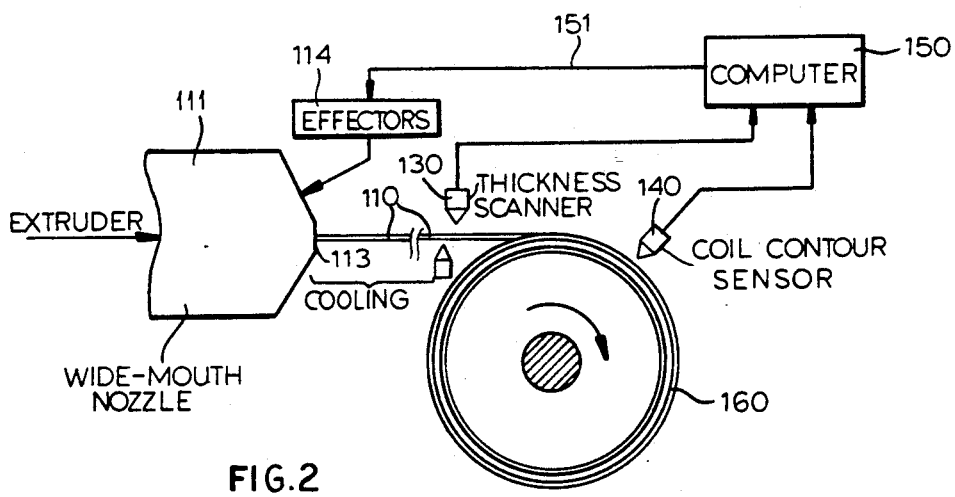
FIG. 2 is a crossing diagram of a flat film extrusion apparatus.

In FIG. 2 I have shown a system wherein the web 110 is extruded directly from a wide-slot nozzle 113 of the extrusion die 111 and in which the effectors 114, for example, servomotors, control the contour of the lips of this die defining the thickness of the film or foil 110. Here a thickness measurement across the width of the web is obtained by the direct-thickness profile sensor 130 whereas an indirect thickness profile is generated by the coil contour scanner 140, both feeding into the computer 150 which controls at 151 the effectors 114. Thus when the computer requires a reduction in thickness for a particular zone of the coil 160, the effectors 114 are operated in the corresponding zone of the nozzle 113 to narrow the orifice and thereby decrease the thickness of the film. Conversely, the computer can control the effectors 113 to increase the thickness of the foil in regions between plus thickness errors.

This 13 diagrammatically illustrated in FIG. 3 where regions 70 and 71 are shown to have plus thickness errors and correction is effected in the correction zone 72 between them. A thickness scanner is represented at 230 in FIG. 3.

Figure 4:
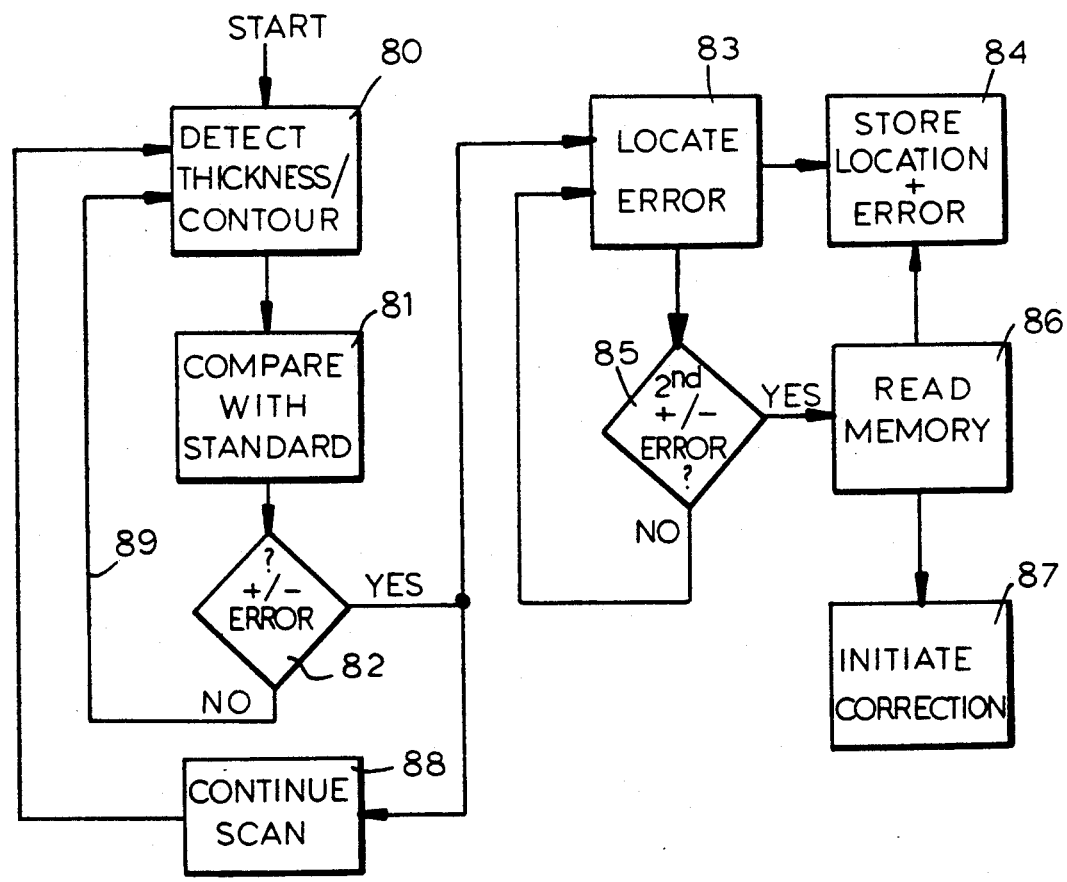
FIG. 4 is an outline of an algorithm by which the method of the invention operates automatically.

The method is partly diagrammed in FIG. 4 in which the first step is shown to be the detection of a thickness profile directly or indirectly via the contour at 80. This thickness contour is compared in the computer with a standard at 81 representing the set point value of the thickness of the film or foil.

If a plus or minus error is detected as represented at 82, the error is located at 83 along the web and correlated with a location on the die extruding the film or the tube from which the film is blown. The location is stored at 84. When a second plus or minus error is detected as represented at 85, the memory is read at 86 and correction is initiated at 87 between the two regions of plus or minus error as noted. The scan is continued at 88 after the initial error is determined to repeat the process and in the event no plus or minus error is detected, the process is iterated as represented at 89.

In the present description, reference has been made to plastic foils and films and it will be understood that these terms are used interchangeably since they are both used to describe the same types of web material in different countries throughout the world.

I claim:

1. A method of making a coil of a plastic foil, the method comprising the steps of:
    a) continuously forming a flat web of a plastic foil having over a width thereof a thickness-error profile including system-produced plus thickness errors and minus thickness errors;
    b) winding said web into a coil;
    c) monitoring at the coil deviations of the coil from a substantially cylindrical contour, and feeding a signal representing the deviations to a computer;
    d) automatically deriving from the signal with said computer a thickness correction by which the thickness of a zone between two regions with plus thickness errors must be increased to eliminate a bulge in the coil at said zone with plus thickness errors and controlling the forming of the web to increase the thickness of the web at said zone by said thickness correction;
    e) maintaining said increase in the thickness of said web at said zone for a length of said web would on said coil to maintain a substantially cylindrical contour thereof; and
    f) iteratively repeating steps c) to e) until said coil is completely wound with said web, thereby forming a complete coil with a substantially constant cross section cylindrical contour.

2. A method of making a coil of a plastic foil, the method comprising the steps of:
    a) continuously forming a flat web of a plastic foil having over a width thereof a thickness-error profile including system-produced plus thickness errors and minus thickness errors;
    b) winding said web into a coil;
    c) monitoring deviations of said coil from a substantially cylindrical contour, and feeding a signal representing the deviations to a computer;
    d) automatically deriving from the signal with said computer a thickness correction by which a zone between two regions with minus thickness errors must be decreased to eliminate a trough in the coil at said zone with minus thickness errors and controlling the forming of the web to decrease the thickness of the web at said zone by said thickness correction;
    e) maintaining said decrease in the thickness of said web at said zone for a length of said web wound on said coil to maintain a substantially cylindrical contour thereof; and
    f) iteratively repeating steps c) to e) until said coil is completely wound with said web, thereby forming a complete coil with a substantially constant cross section cylindrical contour.

3. The method defined in claim 1 wherein said web is formed in step (a) by a stationary tool.

4. The method defined in claim 3 wherein said web is formed in step (a) by extruding a tube from said tool, blowing said tube to form said foil, and flattening said foil to form said web in a flattening device directly followed by said coil.

5. The method defined in claim 3 wherein said web is formed in step (a) by extruding it as a flat web from said tool and said flat web is wound up directly in said coil.

6. The method defined in claim 2 wherein said web is formed in step (a) by a stationary tool.

7. The method defined in claim 6 wherein said web is formed in step (a) by extruding a tube from said tool, blowing said tube to form said foil, and flattening said foil to form said web in a flattening device directly followed by said coil.

8. The method defined in claim 6 wherein said web is formed in step (a) by extruding it as a flat web from said tool and said flat web is wound up directly in said coil.

* * * * *